United States Patent
Estroff et al.

(10) Patent No.: US 8,543,803 B2
(45) Date of Patent: Sep. 24, 2013

(54) APPARATUS, SYSTEM, AND METHOD FOR ACCURATE AUTOMATED SCHEDULING OF COMPUTER SUSPEND AND RESUME

(75) Inventors: Jeffrey Mark Estroff, Cary, NC (US); Mikio Hagiwara, Yamato (JP); James Patrick Hoff, Raleigh, NC (US); Seiichi Kawano, Sagamihara (JP); Randall Scott Springfield, Chapel Hill, NC (US)

(73) Assignee: Lenovo (Singapore) Pte Ltd, Tech Park (SG)

( * ) Notice: Subject to any disclaimer, the term of this patent is extended or adjusted under 35 U.S.C. 154(b) by 1115 days.

(21) Appl. No.: 12/389,892

(22) Filed: Feb. 20, 2009

(65) Prior Publication Data

US 2010/0217968 A1   Aug. 26, 2010

(51) Int. Cl.
G06F 9/00 (2006.01)
G06F 9/24 (2006.01)
G06F 15/177 (2006.01)
G06F 1/24 (2006.01)
G06F 12/00 (2006.01)
G06F 13/00 (2006.01)
G06F 13/28 (2006.01)

(52) U.S. Cl.
USPC ............... 713/100; 713/1; 713/2; 711/103

(58) Field of Classification Search
USPC ................. 713/1, 2, 100; 455/67.11
See application file for complete search history.

(56) References Cited

U.S. PATENT DOCUMENTS

| | | | |
|---|---|---|---|
| 2005/0177710 A1* | 8/2005 | Rothman et al. | 713/2 |
| 2005/0186952 A1* | 8/2005 | Kitajima | 455/419 |
| 2005/0223291 A1* | 10/2005 | Zimmer et al. | 714/34 |
| 2006/0075276 A1* | 4/2006 | Kataria et al. | 714/4 |
| 2007/0101171 A1* | 5/2007 | Morisawa | 713/300 |
| 2008/0197703 A1* | 8/2008 | Tomita | 307/31 |
| 2008/0263344 A1* | 10/2008 | Grignani et al. | 713/2 |
| 2010/0112955 A1* | 5/2010 | Krishnaswamy et al. | 455/67.11 |
| 2010/0153765 A1* | 6/2010 | Stemen et al. | 713/340 |

* cited by examiner

*Primary Examiner* — Paul Yanchus, III
*Assistant Examiner* — Brandon Kinsey
(74) *Attorney, Agent, or Firm* — Kunzler Law Group

(57) ABSTRACT

An apparatus, system, and method are disclosed for suspend-resume scheduling in conjunction with an operation requiring a suspend-resume cycle of a computer 200, including updating, for purposes of system configuration management, a non-volatile memory 506, such as an electrically erasable programmable read-only memory ("EEPROM") 702. A control module 402 sends 806 a request to update the EEPROM 702. A suspend module 404 suspends 818 an operating system 204. A standby module 406 prepares 904 the computer 200 to enter a standby state, estimates 914 a sufficient amount of time to enter the standby state, places 916 the estimate into an alarm register 608, and then enters 918 the standby state. An update module 308 exits 1004 the standby state in response to an alarm signal 612, receives the request if present 1008, writes 1012 the EEPROM 702 with the updated information, and resumes 1018 the operating system 204.

25 Claims, 7 Drawing Sheets

APPARATUS, SYSTEM, AND METHOD FOR ACCURATE AUTOMATED SCHEDULING OF COMPUTER SUSPEND AND RESUME

BACKGROUND

1. Field of the Invention

This invention relates to computer system configuration management and more particularly relates to computer suspend-resume cycling.

2. Description of the Related Art

A computer is a complex system, frequently requiring configuration management to optimize operational efficiency. Timely application of hardware updates is one important dimension of computer operation, both to expand capacity and to improve functionality.

Although some hardware is amenable to a "plug-and-play" and/or "hot-swap" capability in which the hardware may be added or reconfigured without interrupting system operation, hardware changes in general tend to be disruptive and error-prone due to the manual intervention and hardware/software coordination that is required. Operation of the system is suspended, the configuration management is performed, and then system operation is resumed. Minimizing the disruption involved in this process remains an elusive goal.

SUMMARY

From the foregoing discussion, it should be apparent that a long-felt unmet need exists for an apparatus, system, and method that automate the suspend-resume cycle. Beneficially, such an apparatus, system, and method would automate the scheduling of the suspend-resume cycle and associated system configuration activity.

The present invention has been developed in response to the present state of the art, and in particular, in response to the problems and needs in the art that have hitherto proven intractable under currently available system configuration management. Accordingly, the present invention has been developed to provide an apparatus, system, and method for suspend-resume scheduling that overcome many or all of the above-discussed shortcomings in the art.

One approach to partially automate the suspend-resume cycle would be to provide a message instructing the user to manually resume system operation by depressing the power button after the system has automatically suspended operation. The user must wait for the system to suspend, and then depress the power button to start the resume. This approach has the exposure that the user could depress the power button prior to the system being completely suspended.

Another approach to more fully automate the suspend-resume cycle would be to establish a very conservative time estimate for the duration of the entire process of suspending system operation, and then schedule the system to wake up after that time elapses using the real-time clock ("RTC"). The benefit is that the user need not depress the power button to initiate the resume. However, there is a risk that the suspend could take longer than estimated, due to unanticipated delays, causing the resume to be initiated before the suspend has completed. Conversely, if the estimated time is too long, the user may depress the power button to hasten the resume after observing that the suspend has completed, creating the possibility that the scheduled resume could unexpectedly occur later after a subsequent suspend.

The automated process may be significantly improved by waiting until just before the suspend completes to set the RTC, thereby reducing the estimated time to completion. As a result, a smaller margin of error may be achieved, greatly reducing the risk that the suspend might fail to complete within the estimated time, as well as improving the timeliness of the suspend-resume cycle from the user's viewpoint.

The apparatus for suspend-resume scheduling is provided with a plurality of modules configured to functionally execute the necessary steps of sending a request, such as to perform system configuration, suspending the operating system, preparing to enter the standby state, estimating a sufficient amount of time to enter the standby state, adjusting an alarm accordingly, and entering the standby state. These modules in the described embodiments include a control module, a suspend module, and a standby module.

The apparatus, in one embodiment, may reside within the software stack of the computer, with the control module comprising an application, the suspend module comprising a utility of the operating system, and the standby module comprising a firmware utility. The apparatus may further comprise a communication module that conveys the request from the operating system to the firmware.

In a further embodiment, the apparatus may include an update module that exits the standby state in response to the alarm, receives the request, performs the system configuration, and resumes the operating system. The system configuration may comprise updating a non-volatile memory of the computer with hardware configuration settings.

A system of the present invention is also presented for suspend-resume scheduling. The system may be embodied by the computer and the aforementioned modules. In particular, the system, in one embodiment, includes a non-volatile memory. In an embodiment, the RTC may comprise the alarm.

The system may further include a mailbox, accessible both to the operating system and the firmware, through which the request is conveyed by the communication module. In an embodiment, the communication module may utilize a systems management interrupt ("SMI") to access the mailbox.

In a further embodiment, the non-volatile memory may comprise an electrically erasable programmable read-only memory ("EEPROM"). The EEPROM may contain hardware configuration settings. The system updates the hardware configuration settings pursuant to system configuration management.

A method of the present invention is also presented for suspend-resume scheduling. The method in the disclosed embodiments substantially includes the steps necessary to carry out the functions presented above with respect to the operation of the described apparatus and system. The method is applicable not only to system configuration management, but to any system operation that requires a suspend-resume cycle.

In one embodiment, the method includes preparing to enter the standby state of the computer, estimating a sufficient amount of time to enter the standby state, adjusting the alarm of the computer to wake the computer out of the standby state after the sufficient amount of time, and entering the standby state.

The method also may include sending a request to update the non-volatile memory of the computer, suspending an operating system of the computer. Suspending the operating system may also comprise saving data and status information of the operating system.

In a further embodiment, the method includes presetting the alarm to a high time value having a unique signature, wherein the unique signature indicates the existence of the request. The high time value serves as a fallback to help insure that the system eventually resumes in case of any error or omission in the aforementioned adjustment of the alarm. A flag to validate the request may also be provided in addition to or instead of the unique signature.

The method may further include exiting the standby state in response to the alarm, receiving the request, updating the non-volatile memory, and resuming the operating system. Updating the non-volatile memory may comprise unlocking the non-volatile memory, writing the non-volatile memory as specified by the request, and locking the non-volatile memory. Resuming the operating system may further comprise restoring the data and status information of the operating system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
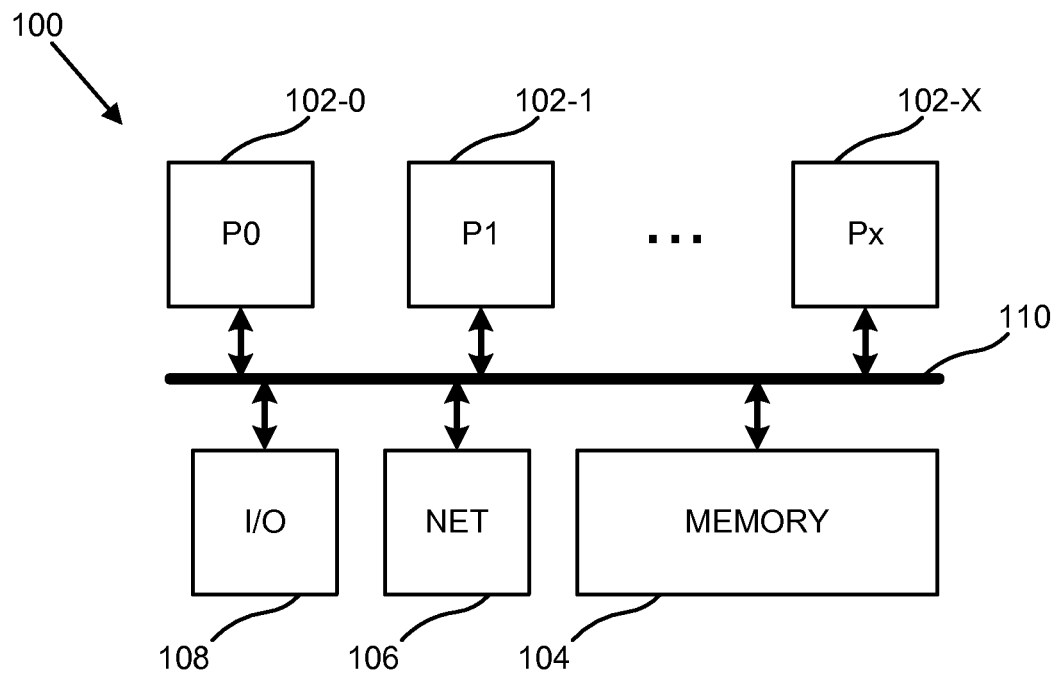
FIG. 1 is a schematic block diagram illustrating a possible computer hardware platform upon which the present invention may be at least in part deployed.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates a possible computer hardware platform 100 upon which the present invention may be at least in part deployed. The hardware platform 100 may include processor(s) 102, memory 104, a network interface 106, and an I/O (Input/Output) device interface 108, connected through a bus 110.

The hardware platform 100 may be of any form factor or type, including an embedded system, a handheld, a notebook, a personal computer, a minicomputer, a server, a mainframe, a supercomputer, and the like.

The processor(s) 102 may be present in any quantity, including a uniprocessor, and may have any instruction set architecture. In an embodiment, the processor(s) 102 may have one or more levels of dedicated or shared caches. Possible physical implementations may include multi-chip, single chip, multi-core, hyperthreaded processors, and the like.

The memory 104 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 106 may support any network protocol or architecture. It may support both wireless and hard-wired network connections. It may comprise Ethernet, Token Ring, System Network Architecture ("SNA"), and the like. In one embodiment, it may be integrated with the I/O device interface 108.

The I/O device interface 108 may be driven primarily by the processor(s) 102 or may incorporate an independent I/O processor subsystem. It may comprise Peripheral Component Interconnect ("PCI"), Small Computer System Interface ("SCSI"), Fiberchannel ("FC"), Enterprise System Connection ("ESCON"), ESCON over Fiberchannel ("FICON"), and the like. In an embodiment, it may include dedicated local I/O devices.

The bus 110 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 110 may comprise a high-speed internal network.

Figure 2:
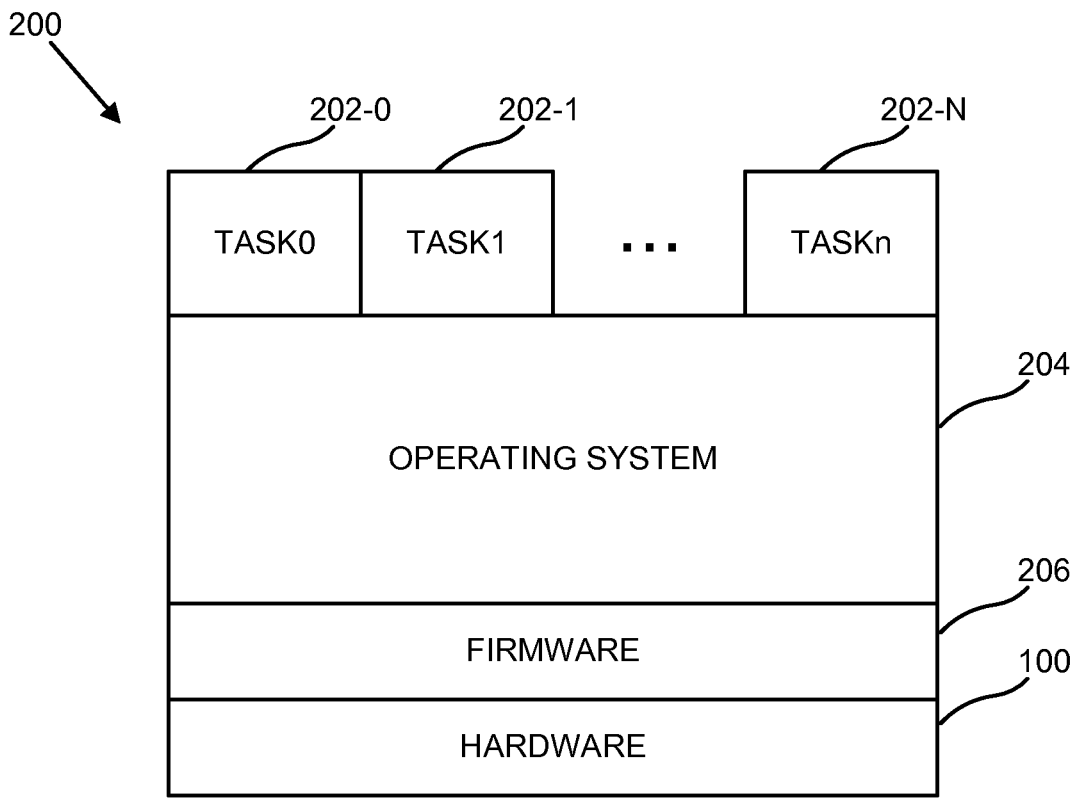
FIG. 2 is a schematic block diagram of a possible computer including a software stack in which the present invention may at least in part reside.

FIG. 2 is a diagram of a possible computer 200 including a software stack in which the present invention may at least in part reside. The software stack may include task(s) 202, hosted on an operating system 204, enabled by firmware 206, running on a hardware platform 100 of which the configuration of FIG. 1 is representative.

The task(s) 202 may include both user- and system-level tasks. They may be interactive or batch. They may run in the foreground or background. User-level task(s) 202 may include applications, programs, jobs, middleware, and the like. System-level task(s) 202 may include services, drivers, daemons, utilities, and the like.

The operating system 204 may be of any type and version and in any state. Types may include Unix, Linux, Windows, Mac, MVS, VMS, and the like. Versions may include Windows XP, Windows Vista, and the like. States may include a degree of customization, a mode of operation, a system preparation for setup, and the like. The operating system 204 may be single-user or multi-user. It may be single-tasking or multi-tasking. In an embodiment, the operating system 204 may be real-time. In another embodiment, the operating system 204 may be embedded.

The firmware 206 may comprise microcode, which may reside in a microstore of the processor(s) 102. In an embodiment, the firmware 206 may comprise low-level software, which may reside in memory 104. In one embodiment, the firmware 206 may comprise a rudimentary operating system 204. In a further embodiment, the firmware 206 may support virtualization so as to permit the concurrent operation of multiple operating systems 204 on a hardware platform 100.

Figure 3:
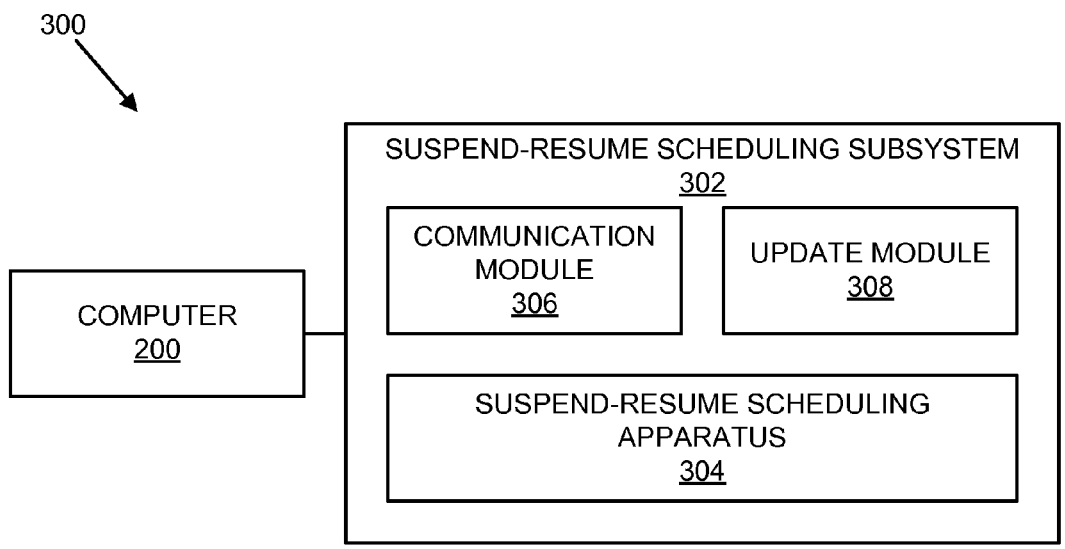
FIG. 3 is a schematic block diagram illustrating a system of the present invention.

FIG. 3 is a schematic block diagram illustrating a system 300 of the present invention, comprising the computer 200 and a suspend-resume scheduling subsystem 302. The subsystem 302 further comprises a suspend-resume scheduling apparatus 304, a communication module 306, and an update module 308. In an embodiment, the foregoing components of the subsystem 302 may be fully or partially implemented within the hardware platform 100 or the software stack of the computer 200. The communication module 306 may implement one or more communication mechanisms, which may be either centralized or distributed throughout the system 300. The apparatus 304 may be employed whenever a suspend-resume cycle is required in order to effect a given operation of the system 300, such as a system configuration update as performed by the update module 308. Other operations requiring a suspend-resume cycle may include system error recovery, storage subsystem imaging, software installation, and the like.

Figure 4:
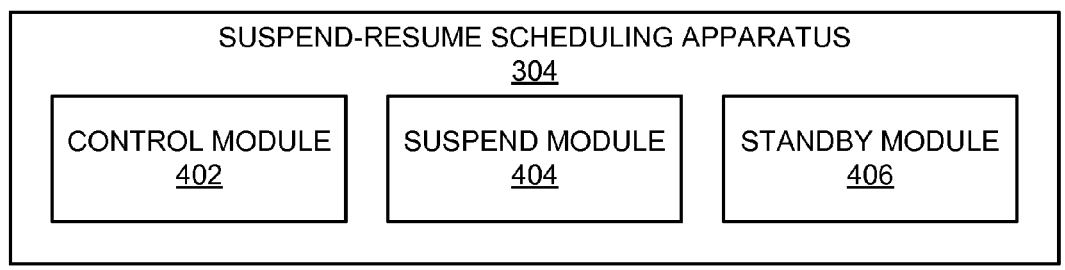
FIG. 4 is a schematic block diagram illustrating a suspend-resume scheduling apparatus in according to the present invention.

FIG. 4 is a schematic block diagram illustrating the suspend-resume scheduling apparatus 304 according to the present invention, comprising a control module 402, a suspend module 404, and a standby module 406. The control module 402 sends a request for an operation requiring a suspend-resume cycle of the computer 200. The request may be either initiated manually by a user, or automatically in response to an event, a condition, and so forth. The suspend module 404 is activated by the control module 402 and suspends the operating system 204 of the computer 200. The standby module 406 is activated by the suspend module 404, responsive to the request from the control module 402, and prepares to enter a standby state of the computer 200, estimates a sufficient amount of time to enter the standby state, adjusts an alarm of the computer 200 to wake the computer 200 out of the standby state after the sufficient amount of time, and enters the standby state. The standby state may comprise logout, sleep, hibernation, reduced power, power off, and the like.

Figure 5:
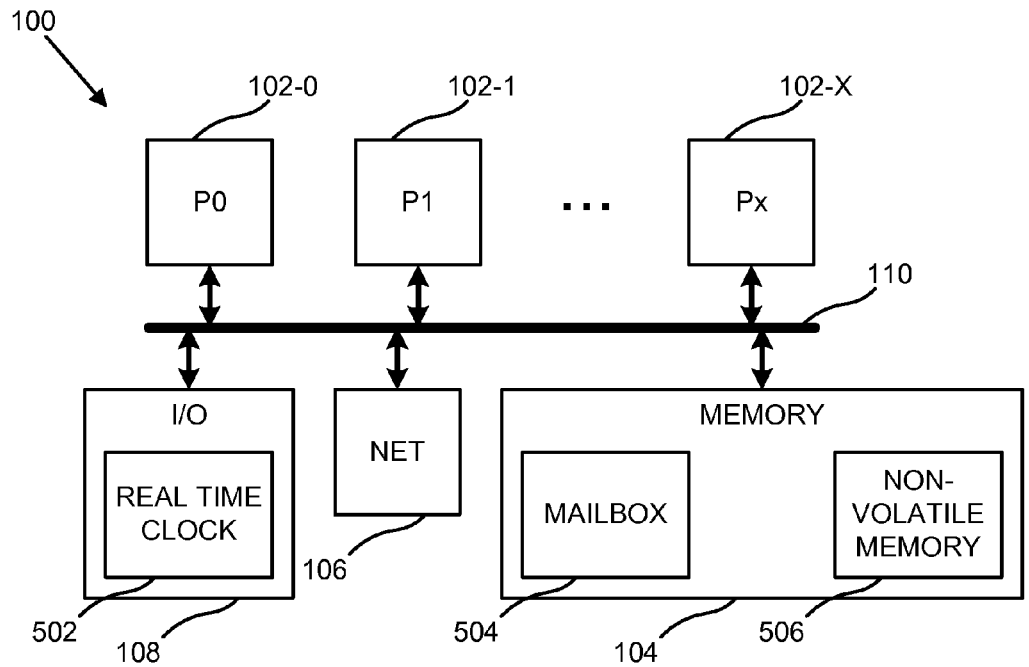
FIG. 5 is a more detailed schematic block diagram of the computer hardware platform.

FIG. 5 is a more detailed schematic block diagram of the computer hardware platform 100. A real-time clock ("RTC") 502 is shown as part of the I/O device interface 108. In an embodiment, the RTC may generate an alarm in the form of an external interrupt, similar to an I/O interrupt. Similar an I/O device, the RTC 502 may not be synchronous with the processor(s) 102. In one embodiment (not shown), the RTC 502 may be apart from the hardware platform 100, accessible via the I/O device interface 108 or the network interface 106. In another embodiment (not shown), the RTC 502 may have a direct attachment to the bus 110.

A mailbox 504 and a non-volatile memory 506 are shown as part of the memory 104, residing within one or more physical memory arrays or logical memory address spaces. The non-volatile memory 506 may contain hardware configuration settings which need to be retained continuously, whether or not the hardware platform 100 is powered on. The hardware configuration settings may include information such as media access control ("MAC") addresses, memory chip select information, and the like. The non-volatile memory 506 may comprise an electrically erasable programmable read-only memory ("EEPROM"), a battery-powered complementary metal-oxide-semiconductor device ("CMOS"), a flash memory device, and the like. The mailbox 504 retains its contents during the standby state, and in one embodiment may reside within a non-volatile type of memory such as flash memory. In another embodiment (not shown), the mailbox 504 may reside within a storage device apart from the hardware platform 100, accessible via the I/O device interface 108 or the network interface 106.

Figure 6:
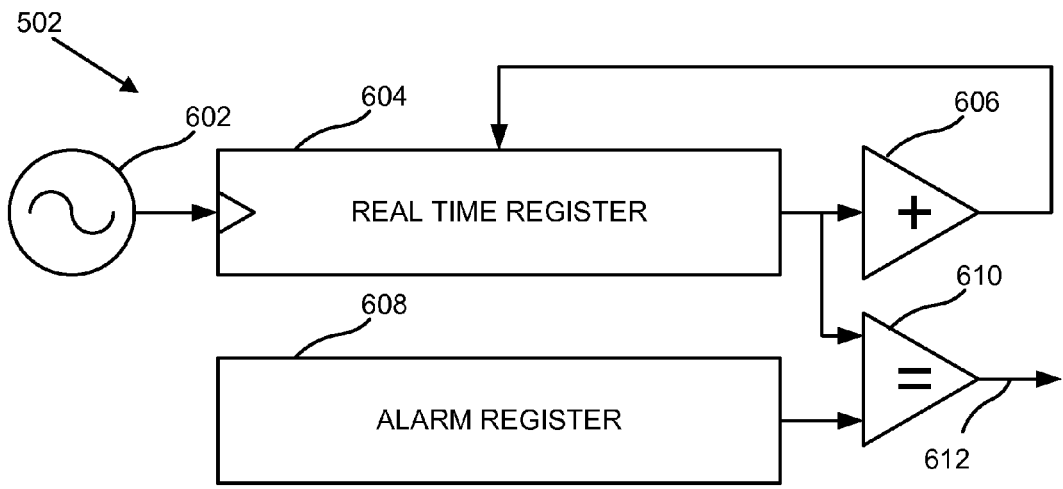
FIG. 6 is a schematic block diagram of one embodiment of a real-time clock ("RTC") of the computer.

FIG. 6 is a schematic block diagram of one embodiment of the RTC 502. An oscillator 602 clocks a real-time register 604, which is incremented each cycle by an incrementor 606. When the contents of the real-time register 604 match the contents of an alarm register 608 as determined by a comparator 610, an alarm signal 612 is generated. In one embodiment, the comparator 610 performs an equality comparison and the alarm signal 612 is thus asserted for one cycle, relying upon the processor 102 or other circuit (not shown) to hold the external interrupt pending until it is accepted and acknowledged. In another embodiment (not shown), the comparator 610 performs a greater-than comparison and the alarm signal 612 is asserted continuously so long as the contents of the real-time register 604 exceed the contents of the alarm register 608. In that case alarm signal 612 may be turned off by loading a higher value into the alarm register 608 after the external interrupt has been accepted.

Figure 7:
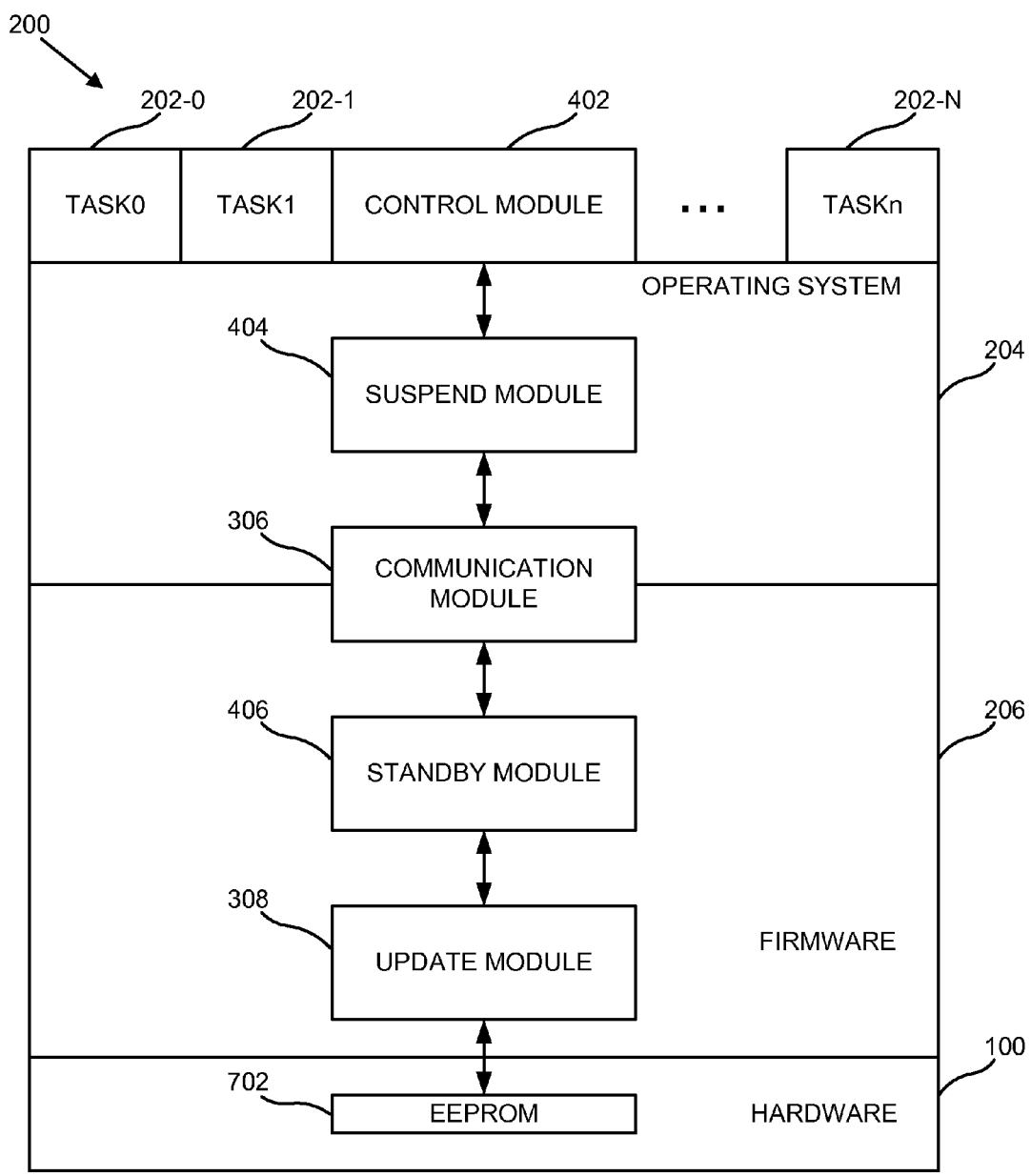
FIG. 7 is a schematic block diagram of one embodiment of the system as may be deployed upon the computer.

FIG. 7 is a schematic block diagram of one embodiment of the system 300 as may be deployed upon the computer 200. The control module 402 may comprise an application or other task 202. The suspend module 404 may comprise a utility of the operating system 204. The standby module 406 and the update module 308 may comprise utilities of the firmware 206. The communication module 306 may comprise functionality that straddles both the operating system 204 and the firmware 206. In an embodiment, the communication module 306 utilizes the mailbox 504 in the memory 104 of the hardware platform 100. The mailbox 504 maintains its contents throughout a suspend-resume cycle, and is read/write accessible to both the operating system 204 and the firmware 206. In one embodiment, the communication module 402 may utilize a systems management interrupt ("SMI") to communicate between a Windows operating system 204 and a basic I/O system ("BIOS") firmware 206.

The update module 308 comprises functionality to update an EEPROM 702, which as noted above is one embodiment of the non-volatile memory 506. Advantages of the EEPROM 702 over other types of non-volatile memory 506 include higher reliability, greater durability in terms of repeated read/write cycles, and the ability to selectively update individual bytes as opposed reading, modifying, and rewriting entire blocks. The contents of EEPROM 702 comprise hardware configuration settings and the like that cannot feasibly be updated during normal operation of the computer 200, and thus require a suspend-resume cycle in order to be safely modified.

Figure 8:
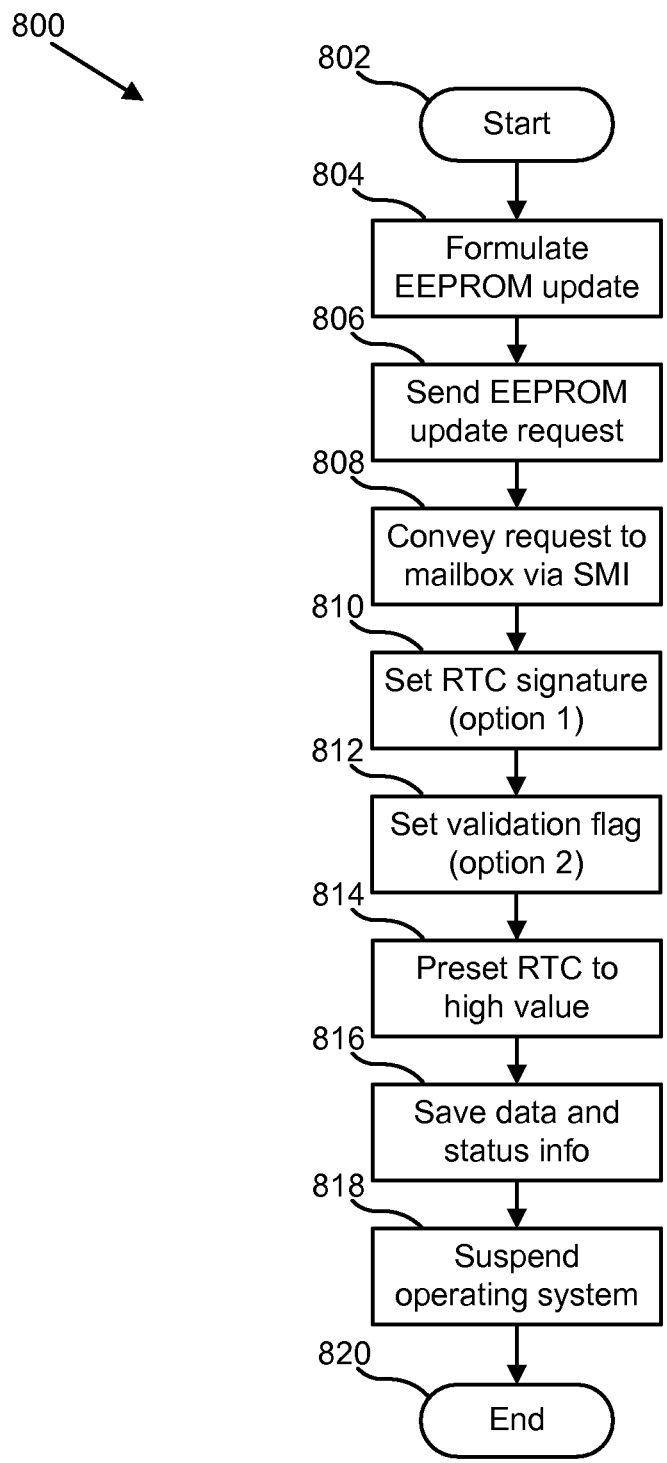
FIG. 8 is a schematic flow chart diagram illustrating one embodiment of a method for suspending operation of the computer in accordance with the present invention.

FIG. 8 is a schematic flow chart diagram illustrating one embodiment of a method for suspending operation of the computer 200 in accordance with the present invention. The method 800 starts 802 and the control module 402 formulates 804 and sends 806 a request to update the EEPROM 702. In one embodiment, the communication module 306 may convey 808 the request through the mailbox 504 via an SMI.

One or more options may be employed to validate the request. A first validation option may be to insert a unique signature in the contents of the alarm register 608. In one embodiment, the unique signature may comprise a predetermined time interval between the current time in the real-time register 604 and the specified time for the alarm signal 612 in the alarm register 608. The predetermined time interval is in one embodiment chosen such that the percentage of the predetermined time interval that elapses during the anticipated duration of the suspend-resume cycle is within an acceptable tolerance for still recognizing it as the unique signature. In another embodiment, the unique signature may comprise a predetermined bit pattern in one or more of the least significant bits of the alarm register 608. The least significant bits are used to permit continued normal use of the higher-order bits of the alarm register 608 with no appreciable loss in timing precision of the alarm signal 612.

A second validation option may be to set a validation flag. In one embodiment, the flag may be stored in the mailbox 504. In another embodiment, the request may be self-validating wherein the request itself comprises the flag, so long as the request or at least the validating portion of the request is erased from the mailbox 504 or otherwise rendered invalid when the request has been completed. In general, the flag may reside within any memory or storage which is accessible both to the operating system 204 and the firmware 206 and persists throughout the suspend-resume cycle.

If the first validation option is employed, the signature is set 810 in the value to be written into the alarm register 608. If the second validation option is employed, the validation flag is set 812. Then the alarm register 608 is preset 814 to a high value, such that time interval between the current time in the real-time register 604 and the specified time for the alarm signal 612 is large in comparison with the anticipated suspend-resume cycle duration. For example, if the suspend-resume cycle typically takes 3 seconds, then a high value of 30 minutes might be used. This high value may serve more than one purpose. If for some reason the standby module 406 malfunctions, or is altogether absent, the high value will insure that the computer 200 eventually resumes operation. The high value may also conveniently serve as the signature for the first validation option as described above. In one embodiment, the step of presetting 814 may be entirely omitted.

The suspend module 404 is invoked next. It should be noted that other processes and user actions may also invoke the suspend module 404. Any data or status information of the operating system 204 that is to be preserved through the suspend-resume cycle is saved 816. The operating system 204 is then suspended 818, and the method ends 820.

Figure 9:
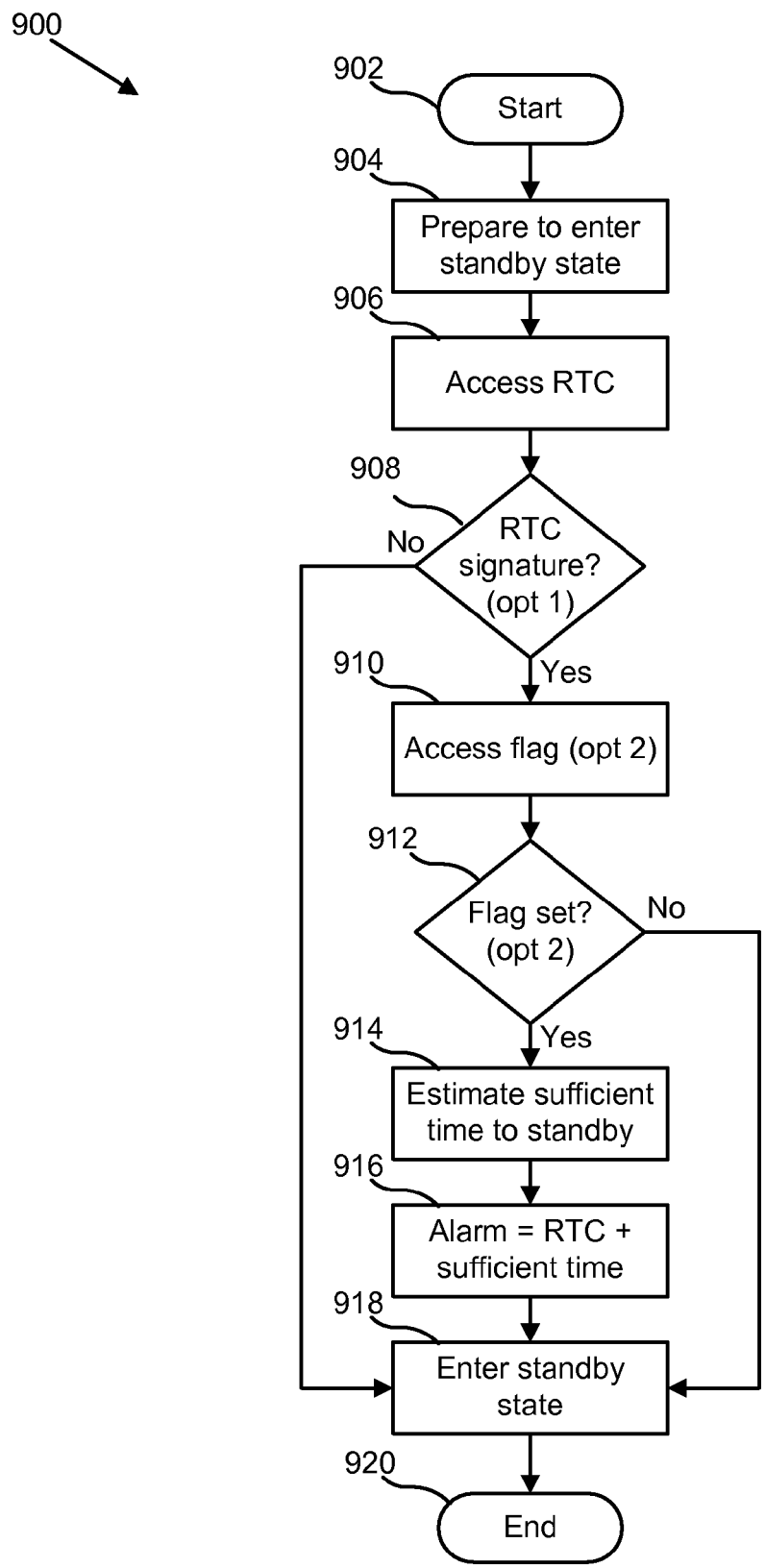
FIG. 9 is a schematic flow chart diagram illustrating one embodiment of a method for accurate automated scheduling in accordance with the present invention.

FIG. 9 is a schematic flow chart diagram illustrating one embodiment of a method for accurate automated scheduling by the standby module 406 in accordance with the present invention. The method 900 starts 902 in response to the suspending of the operating system by the suspend module 404. The computer 200 is prepared 904 to enter the standby state insofar as possible without actually completing entry into the standby state at this point. The RTC 502 is then accessed 906. If the first validation option is implemented, then the alarm register 608 is checked to determine whether the signature is present 908. If the second validation option is implemented, then the validation flag is accessed 910 and a check is made as to whether it is set 912. If neither validation option is implemented, or if the signature is not present 908 and the validation flag is not set 912, indicating that some other process or user action may have invoked the suspend module 404, then the computer 200 enters 918 the standby state and the method 900 ends 920 without scheduling an automatic resume.

If the signature is present 908 or the validation flag is set 912, then a sufficient amount of time to enter the standby state is estimated 914. The time estimate is made conservatively high enough to insure that it is truly sufficient to allow the standby state to be entered, but not so conservative as to unduly impact the timeliness and scheduling accuracy of subsequently resuming operation of the computer 200. The estimated sufficient amount of time is then added to the current time from the real-time register 604 and the sum is placed 916 into the alarm register 608. The standby state is then entered 918 and the method 900 ends.

Figure 10:
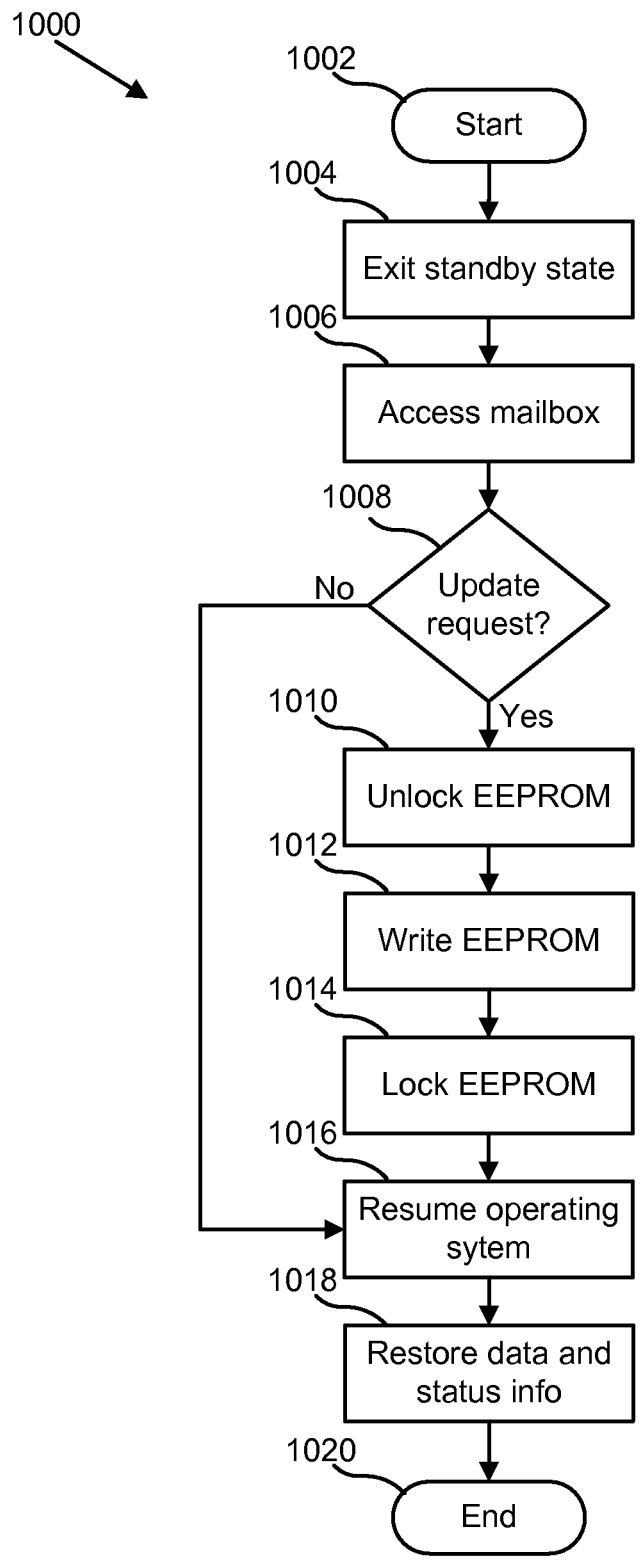
FIG. 10 is a schematic flow chart diagram illustrating one embodiment of a method for resuming operation of the computer in accordance with the present invention.

FIG. 10 is a schematic flow chart diagram illustrating one embodiment of a method for resuming operation of the computer 200 by the update module 308 in accordance with the present invention. The method 1000 starts 1002 as triggered by the alarm signal 612, indicating that the sufficient amount of time to enter standby state has elapsed, and the standby state is exited 1004. It should be noted that other processes and user actions may also invoke the update module 308, solely to resume operation of the computer 200.

The mailbox 504 is then accessed 1006 and checked to determine whether an update request is present 1008. If no update request is present 1008, indicating that some other process or user action may have invoked the update module 404, then the operating system 204 resumes 1016 operation on the computer 200, the data and status information that was saved 816 is restored 1018, and the method 1000 ends 1020.

If an update request is present 1008 in the mailbox 504, then it is processed prior to resuming operation of the computer 200. The non-volatile memory 506 comprising the EEPROM 702 may be unlocked 1010 if protected by a lock. The update is then performed by writing 1012 the EEPROM with the requested information, such as hardware configuration settings. Upon completion of the update the EEPROM is locked 1016 if appropriate. The operating system 204 resumes 1016 operation on the computer 200, the data and status information that was saved 816 is restored 1018, and the method 1000 ends 1020.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a control module that sends a request for an operation requiring a suspend-resume cycle of a computer;
a suspend module activated by the control module that suspends an operating system of the computer; and
a standby module activated by the suspend module and responsive to the request from the control module that
prepares to enter a standby state of the computer,
estimates a sufficient amount of time for the computer to transition to the standby state,
adjusts an alarm of the computer to wake the computer out of the standby state when the sufficient amount of time elapses, and
enters the standby state
wherein the control module, the suspend module, and the standby module comprise one or more of logic hardware and executable code, the executable code stored on one or more non-transitory computer-readable media devices.

2. The apparatus of claim 1, wherein the control module comprises an application.

3. The apparatus of claim 1, wherein the suspend module comprises a utility of the operating system.

4. The apparatus of claim 3, wherein the standby module comprises a utility of firmware.

5. The apparatus of claim 4, further comprising a communication module that conveys the request from the operating system to the firmware.

6. The apparatus of claim 1, further comprising an update module that
exits the standby state in response to the alarm,
receives the request,
updates a non-volatile memory of the computer, and
resumes the operating system.

7. A system comprising:
a computer having an operating system and firmware;
a control module that sends a request to update a non-volatile memory of the computer;
a communication module that conveys the request from the operating system to the firmware;
a suspend module activated by the control module that suspends the operating system;
a standby module activated by the suspend module and responsive to the request from the control module that
prepares to enter a standby state of the computer,
estimates a sufficient amount of time for the computer to transition to the standby state,
adjusts an alarm of the computer to wake the computer out of the standby state when the sufficient amount of time elapses, and
enters the standby state; and
an update module that
exits the standby state in response to the alarm,
receives the request,
updates the non-volatile memory, and
resumes the operating system
wherein the control module, the suspend module, and the standby module comprise one or more of logic hardware and executable code, the executable code stored on one or more non-transitory computer-readable media devices.

8. The system of claim 7, further comprising a mailbox, accessible both to the operating system and the firmware, through which the request is conveyed by the communication module.

9. The system of claim 8, wherein the communication module utilizes a system management interrupt to access the mailbox.

10. The system of claim 7, wherein the non-volatile memory comprises an electrically erasable programmable read-only memory.

11. The system of claim 10, wherein the electrically erasable programmable read-only memory stores hardware configuration settings.

12. The system of claim 7, wherein a real-time clock comprises the alarm.

13. A computer program product comprising a non-transitory computer readable medium having computer usable program code executable to perform operations, the operations of the computer program product comprising:
   sending a request to update a non-volatile memory of a computer;
   suspending an operating system of the computer;
   preparing to enter a standby state of the computer;
   estimating a sufficient amount of time for the computer to transition to the standby state;
   adjusting an alarm of the computer to wake the computer out of the standby state when the sufficient amount of time elapses;
   entering the standby state;
   exiting the standby state in response to the alarm;
   receiving the request;
   updating the non-volatile memory; and
   resuming the operating system.

14. The computer program product of claim 13, wherein the request is conveyed through a mailbox.

15. The computer program product of claim 13, further comprising an operation of presetting the alarm to a high time value having a unique signature.

16. The computer program product of claim 15, wherein the unique signature indicates the existence of the request.

17. The computer program product of claim 13, wherein the operation of updating comprises:
   unlocking the non-volatile memory;
   writing the non-volatile memory as specified by the request; and
   locking the non-volatile memory.

18. A machine-implemented method comprising the steps of:
   preparing to enter a standby state of a computer;
   estimating a sufficient amount of time for the computer to transition to the standby state;
   adjusting an alarm of the computer to wake the computer out of the standby state when the sufficient amount of time elapses; and
   entering the standby state.

19. The method of claim 18, further comprising the steps of:
   sending a request to update a non-volatile memory of the computer; and
   suspending an operating system of the computer.

20. The method of claim 19, further comprising a step of presetting the alarm to a high time value having a unique signature.

21. The method of claim 20, wherein the unique signature indicates existence of the request.

22. The method of claim 19, wherein the step of suspending further comprises saving data and status information of the operating system.

23. The method of claim 18, further comprising the steps of:
   exiting the standby state in response to the alarm;
   receiving the request;
   updating the non-volatile memory; and
   resuming the operating system.

24. The method of claim 23, wherein the step of updating comprises:
   unlocking the non-volatile memory;
   writing the non-volatile memory as specified by the request; and
   locking the non-volatile memory.

25. The method of claim 23, wherein the step of resuming further comprises restoring data and status information of the operating system.

* * * * *